Figure 2:
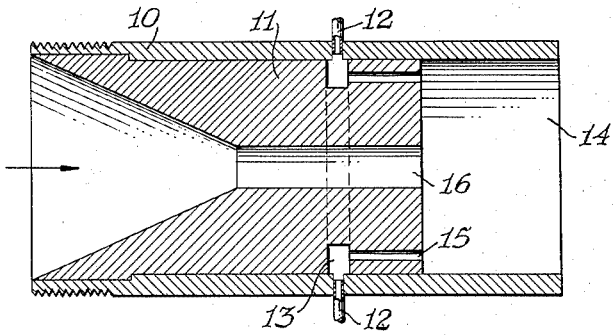

Jan. 16, 1951  F. E. DULMAGE  2,537,977
METHOD OF MAKING A SHAPED THERMOPLASTIC CELLULAR PRODUCT
Filed July 15, 1948

INVENTOR.
Frederick E. Dulmage
BY
Griswold & Burdick
ATTORNEYS

Patented Jan. 16, 1951

2,537,977

UNITED STATES PATENT OFFICE 2,537,977

METHOD OF MAKING A SHAPED THERMO-PLASTIC CELLULAR PRODUCT

Frederick E. Dulmage, Saginaw, Mich., assignor to The Dow Chemical Company, Midland, Mich., a corporation of Delaware Application July 15, 1948, Serial No. 38,873

4 Claims. (Cl. 18—55)

This invention concerns an improved method of making a shaped cellular body by extruding and expanding a mobile gel comprising a normally gaseous agent and a thermoplastic resin. It relates more particularly to a procedure for lubricating outer surfaces of the expanding plastic while passing the same through a forming and shaping chamber so as to produce a shaped cellular body consisting for the most part of an inner mass of individually-closed thin-walled cells with an outer protective covering of the thermoplastic resin.

A method for the production of cellular thermoplastic products of almost any size is disclosed in a copending application, Serial No. 763,989, filed July 26, 1947, to O. R. McIntire, now U. S. Patent No. 2,450,436 wherein a mobile gel comprising a thermoplastic resin, e. g. polystyrene, having a normally gaseous agent such as methyl chloride, methyl ether, propylene, butylene, etc., dissolved therein under pressure, is caused to flow from a pressurizing chamber through a valve or aperture to a zone of lower pressure. Upon release of the pressure, the normally gaseous agent vaporizes and expands the resin to form a stable cellular body.

The mobile gel may be prepared by placing granules of the thermoplastic resin, e. g. polystyrene, in a pressure resistant vessel, adding thereto under pressure a normally gaseous agent such as methyl chloride, propylene, butylene, etc., and maintaining the mixture under pressure until a homogeneous mobile gel is formed. The normally gaseous agent is disolved in the thermoplastic resin in proportions such as to be substantially completely vaporized upon release of the pressure.

In extruding and expanding the mobile gel to form a cellular product, the outlet on the discharge side of the orifice or valve is usually extended beyond the aperture to aid in shaping the expanding cellular mass. Uneven flow of the mobile gel through the orifice, or sticking and non-uniform friction effects of the expanding plastic against the outlet surfaces, causes non-uniform expansion of the plastic and results in production of rough shaggy logs or billets of polystyrene foam, often with deep cracks penetrating to the interior of the cellular body. The cellular bodies frequently split and warp on cooling to room temperature. Because of their irregular shape and the occurrence of such flaws, the cellular bodies yield a high proportion of scrap or waste material when cut into slabs, panels, blocks, or sheets, etc.

Methods heretofore employed to shape the cellular body by passage through a forming chamber and lubricating the surface of the expanding plastic by application thereto of a film of oil, glycerine, glycol, or the like, have the disadvantage of leaving an oily or sticky coating on the surface of the cellular product, and, in general, have been unsatisfactory. It is difficult to distribute such lubricants in thin films over the surface of the expanding plastic so as to obtain a uniform lubricating effect. Incorporating a lubricant, e. g. wax, stearic acid, butyl stearate, sodium oleate, lubricating oil, etc., in admixture with the mobile resinous gel, prior to extruding and expanding the same, has likewise been ineffectual to produce a satisfactory product.

I have now found that a shaped cellular body can be formed from a thermoplastic resin such as polystyrene by extruding a mobile gel, comprising such resin having a normally gaseous agent dissolved therein under pressure, through an orifice into a forming and shaping chamber and expanding and shaping the plastic by passage through the forming and shaping chamber to a zone of lower pressure, preferably atmospheric pressure, while feeding hot water or steam as a lubricant between the outer surfaces of the expanding plastic and the inner surfaces of the forming and shaping chamber. The water or steam lubricates the surface of the plastic and prevents it from sticking to the surfaces of the forming and shaping chamber. This permits an even rate of flow of the expanding cellular body through the shaping chamber and results in production of a cellular body, log or billet of substantially uniform cross-sectional area and of a predetermined shape. The hot water or steam seals the surface of the expanding thermoplastic material and forms a product consisting of an inner mass of unit cells with an outer continuous protective resinous skin. The water or steam also tempers the cellular mass during forming and shaping so that the resultant, shaped, cellular body does not warp or crack on cooling to room temperature or below. Such cellular product when extruded as logs or billets may be cut into boards, blocks, panels, sheets, etc., with a minimum of waste material. By extruding, expanding and shaping the plastic in the form of square or rectangular shaped logs, boards or panels the proportion of scrap material may be still further reduced. Such boards or panels need only to be cut into pieces of a length suitable for installation as heat insulating material, e. g. inserts in the manufacture of refrigerator doors.

The accompanying schematic drawing, partly in section, illustrates certain of the various forms of apparatus suitable for use in practice of the invention. Other forms of apparatus which may be employed will be evident from the illustrations given.

Figure 1:
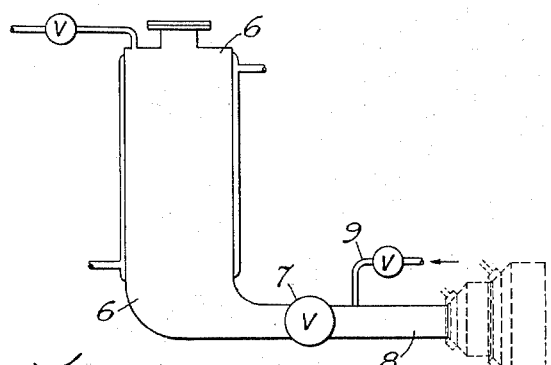

In the drawing, Fig. 1 illustrates, in schematic manner, an arrangement of apparatus that may be used in carrying out the process comprising a jacketed pressure resistant vessel 6, for holding a bed of the mobile resinous gel under pressure, a discharge valve 7 to regulate flow of the mobile gel from the vessel, a forming and shaping device 8 and a feed line 9 with valve for regulating flow of lubricant to the forming and shaping device. The dotted lines illustrate an extension of the shaping device 8 that may be used.

Figs. 2 to 5 show two modifications of a forming and shaping device provided with a channel leading to an open forming and shaping chamber and having ducts for flow of lubricant into the chamber. In these figures of the drawing, similar parts are similarly numbered. The device may be employed in extruding, expanding and shaping the plastic to produce a cellular body having a predetermined shape. The arrows indicate the direction of flow of material through the device.

Figure 3:
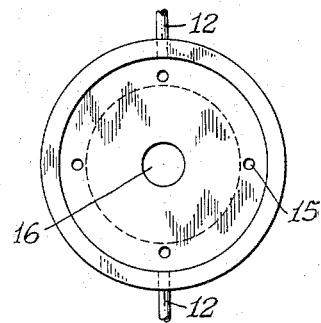

Fig. 2 is a cross-sectional side view, and Fig. 3 is a view of the discharge end, of a device comprising, in concentric arrangement, a casing 10 about a tubular member 11. The casing 10 is provided with inlets 12 which lead to an annular groove 13 near the discharge end of the member 11. The casing 10 is threaded, or provided with other usual attachment means, on the feed end and projects beyond the discharge end of member 11. This projection of the casing 10 constitutes an open forming and shaping chamber, or enlarged passageway, 14. The tubular member 11 is provided with lengthwise channels 15 which lead from the groove 13 in said member to the chamber 14. Usually four or more of the channels, or drill holes 15, are provided at intervals such as to cause a lubricant, feed through the same, via inlets 12 and groove 13, to be distributed quite uniformly over inner walls of the chamber 14. The member 11 is preferably sloped, or funnel-shaped, at the feed end to permit smooth flow of the mobile gel through the constructed passageway 16, to the chamber 14 without entrapment of a gas as bubbles in the device.

Figure 4:
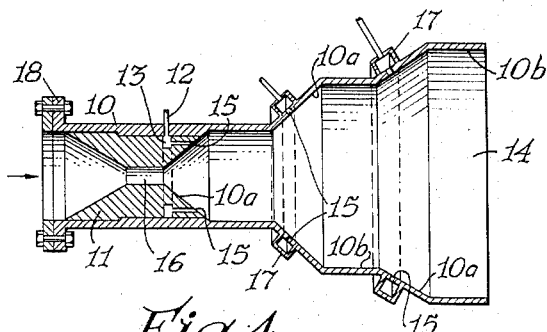
Figure 5:
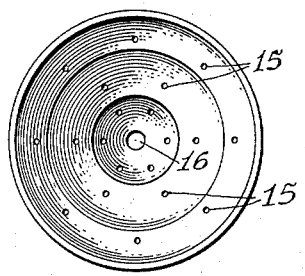

Figs. 4 and 5 are, respectively, a cross-sectional side view and a discharge-end view of a forming and shaping device suitable for use in a preferred mode of operation. The device comprises, in concentric arrangement, a casing 10 and a tubular member 11 having a constructed passageway 16. The casing 10 is provided with a flange 18, or other usual attachment means, on the feed end. It projects beyond the discharge end of the member 11, in a series of expanding forming sections 10a and straight shaping sections 10b so as to form an open expanding and shaping chamber or enlarging passageway 14, to expand and shape the plastic in a stepwise manner. The casing 10 is provided with inlets 12 leading to annular grooves or ducts 13 in members 11 and 17. The members 17 constitute headers. The annular ducts 13 are connected at intervals by channels or drill holes 15 leading into the forming and shaping chamber 14 so as to cause lubricant fed through the same via inlets 12 and annular grooves or ducts 13, to be distributed over inner walls of the chamber 14 and surfaces of the expanding plastic. At both the feed and discharge ends thereof, member 11 is funneled on the inside, the funneled surfaces thereof at the discharge end constituting one of the forming sections 10a of the enlarging passageway 14. The slope of a forming section 10a may be at an angle between about 30° and 90°, preferably 45°, with respect to the main horizontal axis of the device as a whole. The forming and shaping device may be constructed, as shown, so that the enlarging passageway 14 is a continuation of the casing 10, or the device may be constructed of a number of parts attached to each other by suitable means, e. g. threads or bolts. The length and cross-sectional area of the forming and shaping chamber 14 is determined by the size and shape of the cellular body being made and is dependent in part on the cross-sectional area of the constricted passageway 16. The mobile gel is usually expanded to form a shaped cellular body having a volume approximately equivalent to 40 times the volume of the gel. Thus, a circular orifice having a diameter of 0.75 may be used to produce an expanded cylindrical cellular body having a diameter of from 4 to 6 inches. A forming and shaping chamber suitable for producing such shaped cellular body may be from 4 to 8 inches long and have a diameter of from 4 to 6 inches.

The forming and shaping chamber is desirably of a size and length such that expansion of the mobile gel flowing from the constricted passageway 16 is substantially complete prior to it emerging from the chamber 14 as a shaped cellular body. Usually, a forming and shaping chamber having a length approximately equal to the diameter of the log or billet being formed is sufficient to produce a satisfactory product. In general, when shaped cellular bodies other than of circular form, e. g. boards, panels or logs, having a square or rectangular cross-section, are being made, the length of forming and shaping chamber can be determined by making the length of the chamber equal to, or longer than, the diameter of a circle having an area equivalent to the cross-sectional area of the desired cellular body.

A forming and shaping chamber that is too short will, of course, be ineffectual to produce a cellular body having a predetermined shape. In general, a shaping chamber of from two to six times the minimum length required can satisfactorily be used.

Shaped cellular bodies having a cross-sectional area equivalent to that of a circle of from 4 to 6 inches in diameter may be formed in a single expansion and shaping step. When producing cellular products of cross-sectional area greater than that of a circle 6 inches in diameter, the expansion and shaping is preferably carried out in two or more successive stages. For instance, in producing a shaped cellular polystyrene body having a cross-sectional area equivalent to that of a 20 inch diameter circle, the expansion and shaping is carried out in at least two, preferably four, successive stages consisting of alternate expansion and shaping operations. Water or steam is applied, as lubricant, to the surface of the plastic at each expansion step. The forming and shaping chamber employed to produce a 20 inch diameter cellular body is preferably from 20 to 36 inches long.

The method herein disclosed may be applied in producing shaped cellular products from the solid, thermoplastic, resinous, benzene-soluble polymers and copolymers of monovinyl-aromatic compounds having a vinyl group attached directly to a carbon atom of the aromatic nucleus. Among such monovinyl aromatic compounds are styrene, meta-methylstyrene, meta-ethylstyrene, meta-chlorostyrene, para-isopropylstyrene, ortho-chlorostyrene, ortho-ethylstyrene, para-chlorostyrene and alpha-methylstyrene.

The method may also be applied in producing shaped cellular products from other solid thermoplastic resins such as polymethylmethacrylate, and copolymers of vinyl chloride and vinyl acetate, or of methylmethacrylate and styrene, etc.

The process may be carried out by extruding a mobile gel comprising a thermoplastic resin, e. g. polystyrene, having a normally gaseous agent such as methyl chloride, methyl ether, dichlorodifluoromethane, propylene, butylene or the like, dissolved therein under pressure, through a constricted passageway into an open forming and shaping chamber adjoining the passageway and expanding and shaping the plastic, by passage through the chamber to a zone of lower pressure, preferably atmospheric pressure, while feeding hot water or steam, as a lubricant, into contact with the surface of the expanding plastic and also the inner surfaces of the forming and shaping chamber. The mobile gel is usually at temperatures between 60° and 120° C., preferably 90° to 100° C., when extruded into the open forming and shaping chamber and expanded and shaped by passage therethrough into the atmosphere. It cools rapidly, due to vaporization and expansion of its normally gaseous component, during passage through the chamber, thus forming the shaped cellular product.

The water or steam used as lubricant may be employed at temperatures between 120° F. and 225° F., but water or steam having a temperature of from 175° F. to 212° F., is preferably used. Steam, when used, should be saturated with water vapor, since dry steam is difficult to distribute evenly over the surface of the expanding cellular plastic and may result in production of a cellular body of uneven surface, by melting or otherwise contracting, the thin-walled cells. Cold water, i. e. water at a temperature considerably lower, e. g. 20° C., than that of the expanding gel or resin to which it is applied, should be avoided since chilling of the surface of the expanding plastic will prevent complete expansion of the cellular mass and may result in cracking, splitting or warping of the formed cellular body.

The proportion of water, water vapor, or steam employed as lubricant in forming and shaping the expanding cellular mass may vary within wide limits. Sufficient water or saturated steam should be employed to lubricate the surface of the expanding plastic and prevent sticking of the cellular body to the surfaces of the forming and shaping chamber. Usually, the proportion of water or steam employed is determined by the conditions prevailing in the forming and shaping chamber. If the cellular body being produced has a rough surface or flows unevenly from the shaping chamber, the proportion of water or steam is increased. On the contrary, if a large amount of water is flowing from the shaping chamber, together with the cellular body, the proportion of water is decreased.

The lubricating effect of the water, or steam, is rapidly dissipated. The effect usually persists for a distance of about 8 inches from the point of feed of water into the forming and shaping chamber. In practice, water or steam is preferably added at successive intervals of from 4 to 6 inches along the length of the forming and shaping chamber at points where the plastic is expanding. By regulating the proportion of water, or steam, employed as lubricant, the cellular body can be made to flow at an even rate through the forming and shaping chamber with just sufficient friction effect to permit the mobile gel flowing from the orifice to expand and completely fill the shaping chamber with formation of a cellular body having a predetermined shape.

Dilute aqueous dispersions of an oil, such as Turkey red oil, sulfonated castor oil, or the like, in amounts of from 0.5 to 10 per cent by weight of the water used, may be employed as the lubricant. Surface active agents and detergents, e. g. soap, Nacconol NR, sodium alkylarylsulfonate, Aerosol OT, dioctyl ester of sodium sulfosuccinate, Duponol ME, sodium lauryl sulfate, Nopco 1920-$x$, sulfated butyl oleate, Aquarex D, sodium salt of sulfate monoesters of higher fatty alcohols, etc., may be incorporated with the water employed as lubricant, in amounts corresponding to from 0.1 to 10 per cent by weight. Mixtures of such surface active agents dissolved in water may also be used. Small amounts, i. e. from 0.2 to 5 per cent by weight, of one or more other oils, such as lard oil, corn oil, lubricating oil, or the like may be dispersed in water with the aid of surface active agents such as those just described and the mixture be used as a lubricant.

The herein disclosed method of lubricating the surface of the expanding plastic with hot water or steam while passing the plastic through a forming and shaping chamber to produce a shaped cellular body has a number of advantages. For instance, the water or steam is readily distributed over the surface of the expanding plastic and the inner surfaces of the forming and shaping chamber, since it is insoluble in the plastic and immiscible with the normally gaseous agents usually employed as expanding agents. The water may be employed in excess of that required as lubricant without leaving an objectional film of lubricant on the surface of the shaped cellular body. The water or steam when applied as lubricant seals the surface of the expanding plastic during forming and shaping and produces a cellular body having a continuous protective resinous skin. The lubricating effect of the water or steam is rapidly dissipated; thus by feeding the lubricant into the forming and shaping chamber at spaced intervals along its length, the expansion and shaping of the plastic can readily be controlled. As hereinbefore indicated, a limited amount of frictional resistance facilitates full expansion and shaping of the plastic under treatment.

The following example illustrates practice of the invention, but is not to be construed as limiting the scope thereof.

*Example*

A forming and shaping device similar to that shown in Fig. 1 of the drawing was constructed using a standard 4 inch diameter steel pipe for the casing. The casing was threaded on the feed end and extended beyond the orifice aperture on the discharge side to provide a forming and shaping chamber 4 inches long. Two inlets were provided in the casing for feeding fluid via an annular interior duct and suitable outlets, into the forming and shaping chamber. The constricted passageway for flow of the mobile gel into the forming and shaping chamber was of circular shape and had a diameter of 0.75 inch. The device was attached, by means of the threads, to a valve on a closed pressure resistant storage vessel containing a supply of a mobile gel comprising 100 parts by weight polystyrene and 15 parts by weight methyl chloride, under pressure, at a temperature of 95° C. The inlets for feeding water into the forming and shaping chamber were connected to a pump supplying hot water under pressure, at a temperature of 180° F. The valve was opened and the mobile gel of polystyrene and methyl chloride extruded through the constricted passageway into the open forming and shaping chamber, while feeding hot water, as lubricant, at a temperature of 180° F., into contact with inner walls of the chamber and also into contact with the surface of the expanding plastic. There was obtained a cylindrical cellular body consisting of an inner mass of unit cells with a smooth outer resinous skin. The shaped cellular body flowed at an even rate from the shaping chamber. When application of water, as lubricant, to the surface of the expanding plastic surface was stopped, the cellular body emerged from the shaping chamber at an uneven rate and had a rough surface. Upon resuming feed of the hot water to the forming and shaping device into contact with the surface of the expanding plastic, the extrusion, forming and shaping of the cellular body proceeded at an even rate to produce a cylindrical cellular body of uniform cross-section.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of making a shaped thermoplastic cellular body from a mobile gel comprising a thermoplastic resin having a normally gaseous agent dissolved therein under pressure, the steps of extruding the mobile gel at temperatures between 60° C. and 120° C. through a constricted passageway into an open forming and shaping chamber and feeding water at temperatures between 120° F. and 225° F., as lubricant, between the inner walls of said chamber and outer surfaces of the expanding plastic, without intimately admixing the water with the body of plastic material, while forming and shaping the expanding plastic by passage through said chamber.

2. In a method of making a shaped thermoplastic cellular body from a mobile gel comprising (1) a thermoplastic resinous benzene-soluble polymer of a monovinyl-aromatic compound having a vinyl group attached directly to a carbon atom of the aromatic nucleus, having (2) a normally gaseous agent dissolved therein under pressure, the steps of extruding the mobile gel at temperatures between 60° C. and 120° C. through a constricted passageway into an open forming and shaping chamber, and feeding water at temperatures between 120° F. and 225° F. as lubricant between inner walls of said chamber and outer surfaces of the expanding plastic, without intimately admixing the water with the body of plastic material, while forming and shaping the expanding plastic by passage through said chamber into the atmosphere.

3. In a method of making a shaped cellular polystyrene body from a mobile gel comprising polystyrene having a normally gaseous agent dissolved therein under pressure, the steps of extruding the mobile gel at temperatures between 60° C. and 120° C. through a constricted passageway into a forming and shaping chamber open to atmospheric pressure and feeding water at temperatures between 120° F. and 225° F., as lubricant, between inner walls of said chamber and outer surfaces of the expanding plastic, without intimately admixing the water with the body of plastic material, while passing the plastic through said chamber.

4. In a method of making a shaped cellular polystyrene body from a mobile gel comprising 100 parts by weight of polystyrene and 15 parts by weight of methyl chloride, the steps of extruding the mobile gel at temperatures between 90° C. and 100° C. through a constricted passageway into a forming and shaping chamber open to atmospheric pressure, and feeding water at temperatures between 175° F. and 212° F. as lubricant between inner walls of said chamber and outer surfaces of the expanding plastic, without intimately admixing the water with the body of plastic material, while forming and shaping the expanding plastic by passage through said chamber.

FREDERICK E. DULMAGE.

REFERENCES CITED

The following references are of record in the file of this patent:

UNITED STATES PATENTS

| Number | Name | Date |
|---|---|---|
| 1,673,685 | Johnston et al. | June 12, 1928 |
| 2,023,204 | Munters et al. | Dec. 3, 1935 |
| 2,307,034 | Gaenzle | Jan. 5, 1943 |
| 2,365,375 | Bailey et al. | Dec. 19, 1944 |